(12) United States Patent
Dooley

(10) Patent No.: US 7,288,910 B2
(45) Date of Patent: Oct. 30, 2007

(54) SENSORLESS CONTROL IN A PERMANENT MAGNET MACHINE

(75) Inventor: Kevin Allan Dooley, Mississauga (CA)

(73) Assignee: Pratt & Whitney Canada Corp., Longueil, Québec (CA)

(*) Notice: Subject to any disclaimer, the term of this patent is extended or adjusted under 35 U.S.C. 154(b) by 487 days.

(21) Appl. No.: 10/724,148

(22) Filed: Dec. 1, 2003

(65) Prior Publication Data

US 2005/0116675 A1    Jun. 2, 2005

(51) Int. Cl.
    *H01R 39/46*    (2006.01)
(52) U.S. Cl. .............. 318/439; 318/138; 318/254; 318/184; 318/198
(58) Field of Classification Search ............... None
    See application file for complete search history.

(56) References Cited

U.S. PATENT DOCUMENTS

| | | | |
|---|---|---|---|
| 4,322,666 A * | 3/1982 | Muller ............ 318/254 |
| 4,450,396 A | 5/1984 | Thornton |
| 4,480,218 A | 10/1984 | Hair |
| 4,654,566 A | 3/1987 | Erdman |
| 5,202,614 A | 4/1993 | Peters et al. |
| 5,221,880 A * | 6/1993 | Bartholow et al. ......... 318/139 |
| 5,245,238 A | 9/1993 | Lynch et al. |
| 5,260,642 A | 11/1993 | Huss |
| 5,423,192 A | 6/1995 | Young et al. |
| 5,473,240 A | 12/1995 | Moreira |
| 5,481,166 A | 1/1996 | Moreira |
| 5,517,095 A | 5/1996 | Carobolante et al. |
| 5,739,652 A | 4/1998 | Sriram |
| 5,751,131 A | 5/1998 | Sears et al. |
| 5,821,660 A * | 10/1998 | Anderson ................ 310/184 |
| 5,838,122 A * | 11/1998 | Vu ............................ 318/254 |
| 5,859,520 A | 1/1999 | Bourgeois et al. |
| 6,060,809 A * | 5/2000 | Pengov ..................... 310/168 |
| 6,163,127 A | 12/2000 | Patel et al. |
| 6,184,647 B1 | 2/2001 | Oguro et al. |
| 6,208,110 B1 | 3/2001 | O'Meara et al. |
| 6,236,183 B1 | 5/2001 | Schroeder |
| 6,326,752 B1 | 12/2001 | Jensen et al. |
| 6,326,760 B1 | 12/2001 | Cardoletti et al. |
| 6,486,633 B1 | 11/2002 | Kronenberg |
| 6,528,967 B2 | 3/2003 | Hallidy |
| 6,548,976 B2 | 4/2003 | Jensen et al. |

FOREIGN PATENT DOCUMENTS

| EP | 0 449 687 | 10/1991 |
|---|---|---|
| WO | WO 89/11523 | 11/1989 |

OTHER PUBLICATIONS

MC33035, NCV33035—Brushless DC Motor Controller, May 2002.
Position Sensorless Control of Surface Mount Permanent Magnet AC (PMAC) Motors at Low Speeds.
Position Sensorless Control of Surface Mount Permanent Magnet AC (PMAC) Motors at Low Speeds, 1999, no month.

\* cited by examiner

*Primary Examiner*—Lincoln Donovan
(74) *Attorney, Agent, or Firm*—Ogilvy Renault LLP

(57) ABSTRACT

An apparatus and method for providing improved sensorless control of permanent magnet motors is described. Induced electricity from at least one winding set is used to determine rotor position and provide feedback to a commutation circuit driving at least another winding set isolated from the first.

16 Claims, 14 Drawing Sheets

SENSORLESS CONTROL IN A PERMANENT MAGNET MACHINE

BACKGROUND OF THE INVENTION

To effectively drive a permanent magnet synchronous motor (PMSM), the motor control system requires accurate information on rotor position. Sensors such as Hall sensors may be used to sense rotor position, however this increases cost and weight, decreases reliability, and subjects the motor to temperature limitations imposed by the operational limitations of the sensors.

Sensorless control is known, and typically involves estimation of the rotor speed and/or position based on induced EMF or back-EMF occurring in an unenergized main or auxiliary stator winding. One well-known technique involves monitoring zero voltage crossings in the back EMF of the unenergized motor winding, which can be used to establish the position of the rotor, which is then fed back to the commutating circuit to provide proper commutation sequence to the stator windings. Difficulties are encountered, however, due to EMF interference in the winding caused by the driven windings, and filters added to reduce the interference themselves introduce delay and cost. Improvement in sensorless control is therefore desirable, and it is an object of the present invention to provide such improvement.

SUMMARY OF THE INVENTION

In one aspect, the invention provides a motor system comprising a stator, the stator having at least a first and a second multiphase winding, the first and second windings being electrically isolated from one another and non-interlaced with one another, a rotor mounted for movement relative to the stator, the rotor having at least one permanent magnet mounted thereon, a drive circuit including a power source and a commutation circuit, the drive circuit electrically connected to at least the first winding to, in use, provide electricity to the first winding to rotationally drive the rotor about the axis, and a rotor position recognition circuit connected to the second winding, the rotor position recognition circuit adapted to, in use, determine rotor position based on an electricity induced in the second winding when the rotor passes the second winding, the rotor position recognition circuit connected to drive circuit for providing feedback information to the drive circuit regarding said determined rotor position.

In another aspect, the invention provides an electric motor system comprising a rotor mounted for rotation about an axis, the rotor having at least one permanent magnet mounted thereon, a generally cylindrical stator, the stator having at least a first and second sector relative to the rotor rotation axis, the first and second sectors being distinct from one another, the stator having at least two multiphase winding sets, wherein the at least two winding sets are confined to a different one of said sectors, a motor drive connected to a power source and one of the windings sets to thereby selectively energized the winding set to electrically drive rotation of the rotor, and a rotor position decoder connected to the other winding set to thereby acquire signals from the other winding for providing rotor position information to the motor drive.

In another aspect, the invention provides a motor system comprising a permanent magnet rotor, stator having at least a first multiphase winding set and a second multiphase winding set, the first and second winding sets substantially electrically and magnetically isolated from one another, the first set positioned in the stator such that, in use, magnetism induced by electricity flowing therethrough causes the rotor to rotate, the second positioned in the stator such that, in use, the rotating rotor induces electricity to flow therethrough, a first control system adapted to provide electricity to the first winding set to continuously drive rotation of the rotor, and a second control system adapted to receive electricity induced in the second windings and provide rotor position information to the first control system.

In another aspect, the invention provides a motor system comprising a permanent magnet rotor, a stator having at least a first multiphase winding set and a second multiphase winding set, the first and second winding sets substantially electrically and magnetically isolated from one another, a motor drive connected to a power source and the first winding sets to thereby selectively energized the first winding set to electrically drive rotation of the rotor, and a rotor position decoder connected between the second winding set and the motor drive to thereby acquire signals from the second winding for providing rotor position information to the motor drive.

In another aspect, the invention provides a brushless motor system comprising at least a first magnetic circuit including at least a first permanent magnet rotor mounted for rotation on a shaft, a first stator adjacent the first rotor, and at least one multiphase winding set associated with the first stator, at least a second magnetic circuit including at least a second permanent magnet rotor mounted for rotation on the shaft, a second stator adjacent the second rotor, and at least one multiphase winding set associated with the second stator, the second stator winding set being electrically isolated from the first stator winding set, the second magnetic circuit being isolated from the first magnetic circuit, a commutation apparatus adapted to, in use, provide commutation signals to the first winding to cause the first winding set to drive rotation of the first rotor; and a rotor position sensing apparatus adapted to, in use, receive input from the second winding set and provide output rotor position information to the commutation apparatus.

In another aspect, the invention provides a method of operating a motor system, the system having at least a motor, a commutation apparatus, a rotor position detecting apparatus and a source of electricity, the motor having at least a rotor and a stator, the method comprising the steps of providing at least two multiphase winding sets in the stator, electrically isolating the at least two multiphase winding sets from one another, providing electricity from the commutation apparatus to at least a first winding set of said at least two winding sets to thereby continuously drive rotor rotation with said at least first winding set, leaving at least a second winding set of said at least two winding sets continuously unenergized such that said rotor rotation induces electricity in the second winding set, providing said induced electricity to the rotor position detecting apparatus to produce rotor position information, and providing said rotor position information to the commutation apparatus for at least one of verifying and adjusting a commutation process conducted by the commutation apparatus.

In another aspect, the invention provides a method of controlling a motor comprising the steps of providing commutation signals to at least a first multiphase winding set in a stator to rotate a permanent magnet rotor, receiving rotor-induced electricity in at least a second multiphase winding set, the second multiphase winding set magnetically isolated from the first set, using said received electricity to determine information on a position of the rotor, and using said position information as an input in controlling the motor.

In another aspect, the invention provides a method of operating a motor, the motor having a permanent magnet rotor and a stator, the stator having at least a first multiphase winding set and a second multiphase winding set, the first and second winding sets substantially electrically and magnetically isolated from one another, the method comprising the steps of providing commutation signals to the first winding set to rotate a permanent magnet rotor, providing no input electricity to the second winding set, receiving rotor-induced electricity from second multiphase winding set, determining rotor position information from the rotor-induced electricity, using said information to adjust the commutation signals.

BRIEF DESCRIPTION OF THE DRAWINGS

For a better understanding of the present invention and to show more clearly how it may be carried into effect, reference will now be made by way of example to the accompanying drawings showing articles made according to preferred embodiments of the present invention, in which.

DETAILED DESCRIPTION OF THE PREFERRED EMBODIMENT

The present invention is suited for use with the machine configurations described in the applicant's co-pending applications Ser. Nos. 10/444,952, filed 27 May 2003, and 10/452,135 filed 3 Jun. 2003, the contents of both of which are incorporated into this description by reference.

Figure 1:
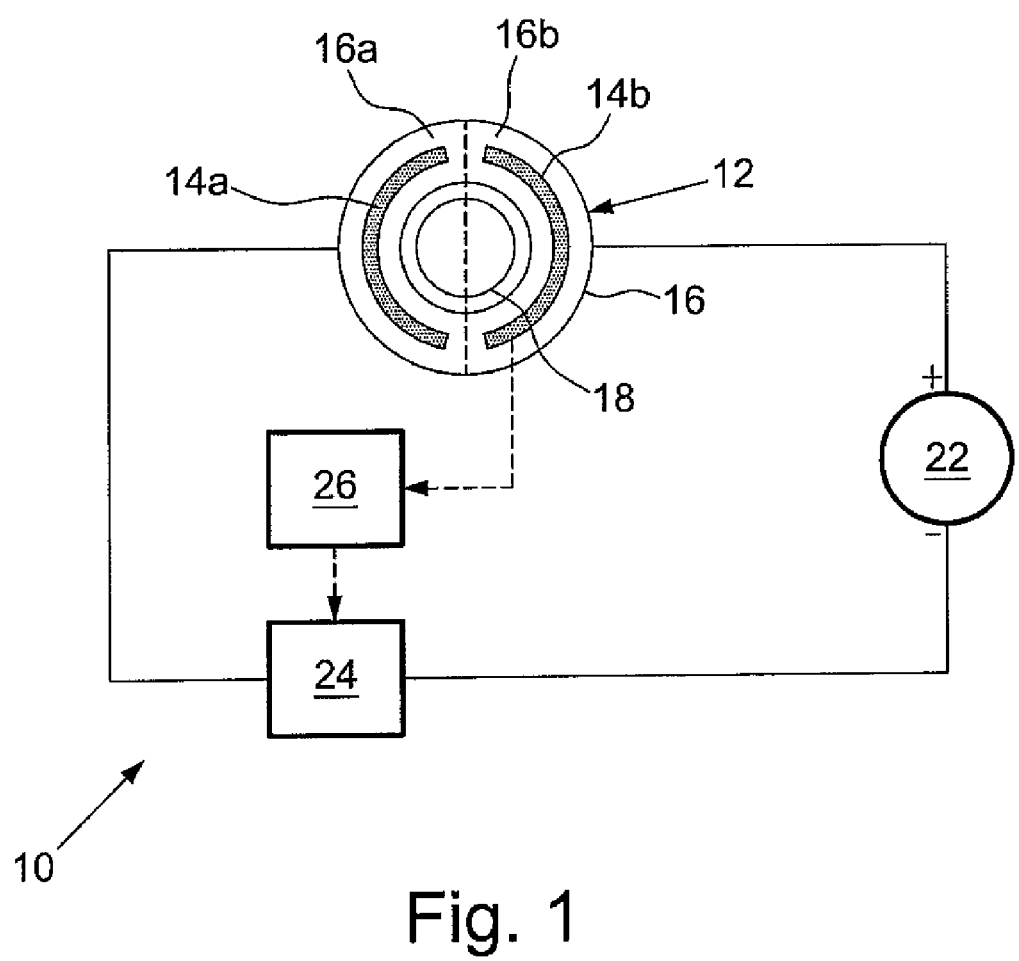
FIG. 1 is a schematic representation of a motor and control system according to the present invention.

Referring to FIG. 1, a permanent magnet synchronous motor (PMSM) system 10 includes a brushless permanent magnet machine 12, which has a "split" construction in that it includes magnetically and electrically isolated stator winding sets 14a and 14b within associated stator portions 16a and 16b, respectively. Winding set 14a and 14b are independently controllable such that machine 12 is essentially two distinct machines 12 preferably within one casing (not shown), and having only a rotatable magnetic rotor 18 as a common component. Rotor 18 is independently excited, preferably having permanent magnets mounted thereto (not shown) in an manner well understood in the art. Winding sets 14a and 14b are preferably each three-phase winding sets and are sequentially distributed circumferentially around stator, so that sets 14a and 14b are non-interlaced and do not overlap, and thus are spatially remote and distinctly positioned from each other. Machine 12 is connected to a load 20 (see FIG. 2), a power source 22, a motor drive commutation circuit 24 and a rotor position recognition circuit 26.

Figure 2A:
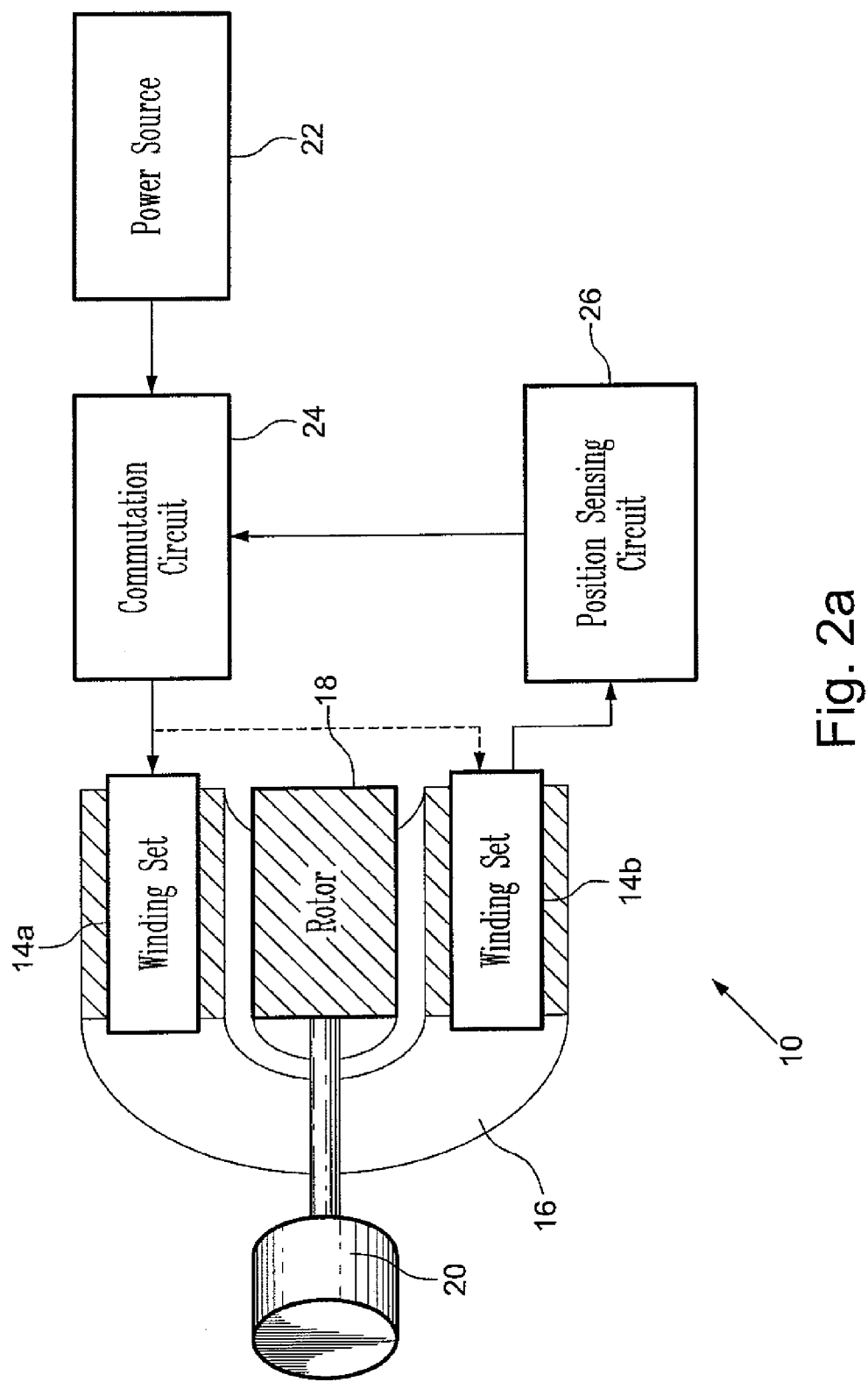
FIG. 2a is a schematic representation of a portion of the motor and control system of FIG. 1.
Figure 2B:
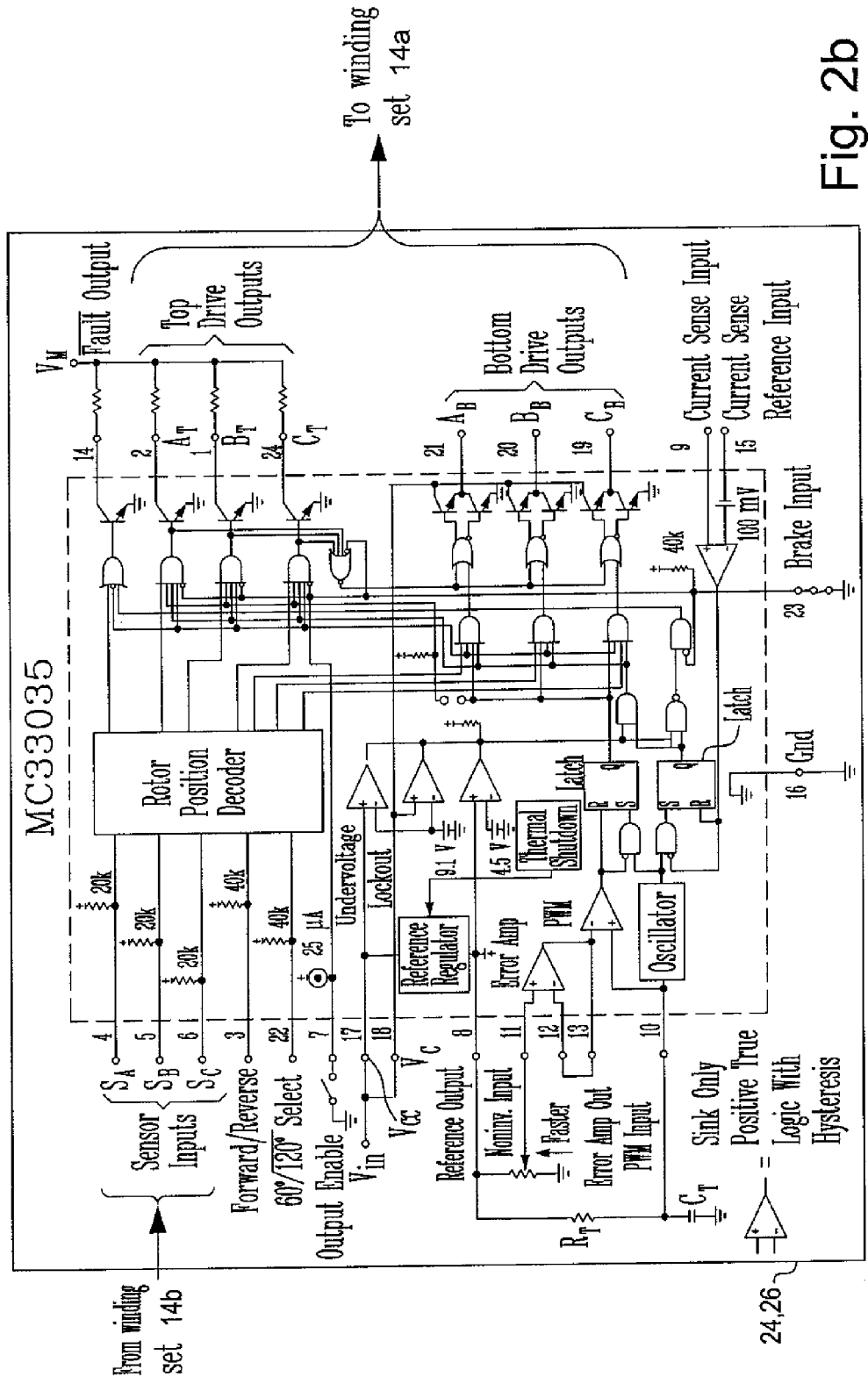
FIG. 2b is a schematic representation of a portion of the control system of FIG. 1.

Referring to FIG. 2a, three-phase winding set 14a is electrically connected to power source 22 via commutation circuit 24, and three-phase winding set 14b is preferably also selectively connected to power source 22 via commutation circuit 24 (the selective connection being connoted by the stippled line). Winding set 14b is also electrically connected to rotor position recognition circuit 26 which is, in turn, connected for feedback communication with commutation circuit 24.

In use, the motor is started, as described in more detail below. Once the motor is running, power provided by source 22 is commutated by commutation circuit 24 and supplied to one set of windings, say winding set 14a, to thereby drive rotor 18 and cause the machine 12 to operate as a motor. As rotor 18 passes the undriven set of windings, in this example 14b, the motion of the magnet in rotor 18 relative to windings 14b induces EMF in windings 14b (windings 14b, being undriven, therefore act as a sort of generator), which induced EMF is used according to the present invention by rotor position recognition circuit 26 to determine rotor position, as will be described further below. Rotor position may then be determined, and this feedback is then provided to the commutating circuit 24 so that the excitation current provided to winding set 14a may be properly timed and adjusted, if and as necessary, to drive windings 14a to produce the desired output torque, etc. from machine 12.

EMF signals induced in windings 14b are fed to an appropriate circuit 26 for determination of rotor position based on the induced EMF signals. Any suitable method of determining rotor position from the induced signals may be used. In an analog embodiment, a voltage comparator (not shown) is used to compare the signal against a reference input of 0V to determine the zero-crossings, representative of the 0° and 180° positions in a sine wave induced voltage. In a digital embodiment (not shown), the induced analog voltage is converted to a digital signal and fed to an appropriate circuit for detection of the appropriate value. In either case, a circuit which is suitable for use in determining rotor position based on signals received from three Hall sensors may be used and fed appropriately with preferably conditioned signals (see below) from windings 14b to determine rotor position, once rotor rotation has started. In a preferred embodiment, the functional operations of motor drive and commutation circuit 24 and a rotor position sensing circuit 26 are accomplished through the use of commercially available brushless motor controllers, such as Motorola Inc.'s MC33035 Brushless Motor Controller shown in FIG. 2b. The skilled reader will appreciate, in light of this disclosure herein, that some signal conditioning (not shown) may be desired or required for the input signals for such a controller (e.g. variable voltage input sine wave converted to a fixed amplitude square wave of the type typically produced by a Hall sensor).

Initially motor 12 must be started in order to get rotor 18 moving relative to stator 16, so that EMF is induced in windings 14b and so that rotor 18 position can be determined. Initially the position of rotor 18 is unknown. For starting motor 12, therefore, the system is run in a starting or 'jogging' mode, which is performed open loop (i.e. with no position feedback), and relies on the polar moment of inertia in conjunction with the torque-current constant of the motor to start rotation of rotor 18. In essence, a rotor position is assumed and the commutation signal is provided appropriately preferably to both windings 14a and 14b, in order to provide enough torque to begin movement of the rotor. Once rotor 18 is thus 'jogged' (i.e. moved), this movement results in a signal induced in windings 14a and 14b that is then detectable as a position signal (particularly in the unenergized windings), as described above, and the operation of commutation circuit 24 can be adjusted accordingly to bring the motor up to speed. The approach may be an iterative one (i.e. the rotor may not start rotating as desired on the first 'jog'), and thus several successive attempts may need to be made in order to start the desired rotation of rotor 18. One winding set 14, or all winding sets 14, can be driven as described initially. Furthermore, unenergized windings in either set 14 can be used as the "sensor" in the start mode. Preferably, however, only one set (e.g. 14a) is driven on a given start, and then the other set (e.g. 14b) is driven on the next start and so on. In the event that there is a failed function(s) in either the motoring or sensing functions of the winding sets, this can be detected and can be addressed. In the case of the gas turbine shown in FIG. 7 and described below, preferably this fault detection can be accomplished before engine-start is accomplished.

If both winding sets 14a and 14b are used to start motor, once rotation begins to occur, preferably as one phase of winding set 14b (in this example) is de-energized, the induced EMF is fed to rotor position recognition circuit 26 to permit the position of rotor 18 to be determined. Finally, once motor 12 approaches a condition where sufficient torque may be provided entirely by winding set 14a (in this example), winding set 14b is completely de-energized and thereafter undriven to then provide the three-phase rotor position recognition function, as described initially above.

The present invention, therefore, teaches in one aspect the provision and use of at least one winding, and preferably a three-phase winding set, which is electrically and magnetically isolated from the active windings in the motor for use in decoding and recognizing rotor position in PMSM motor. The invention thus permits more accurate and simpler rotor position recognition because the signal provided for analysis is reduced in noise, without reliance on filters, and thus permits zeroes to be more accurately counted, leading to improved motor control.

Additional embodiments are possible. Throughout this description as various embodiments are described, each embodiment is provided with reference numerals in successive "100s" series (e.g. 100, 200, 300, etc.). Features in later embodiments similar to those in earlier embodiments are given the same basic reference number in successive series as in the original series (e.g. rotor 18 and rotors 118, 218, 318, etc.). Where the construction and/or operation of such embodiment features is not described further below, the reader may assume that construction and operation are as described above, having regard to those modifications apparent to those skilled in the art. Also, for ease of reference, each winding set and its associated electromagnetic system are occasionally referred to as "channels", such that machine 12 may be described as a "dual channel" motor, having two electromagnetically isolated "channels" or winding sets.

Figure 3A:
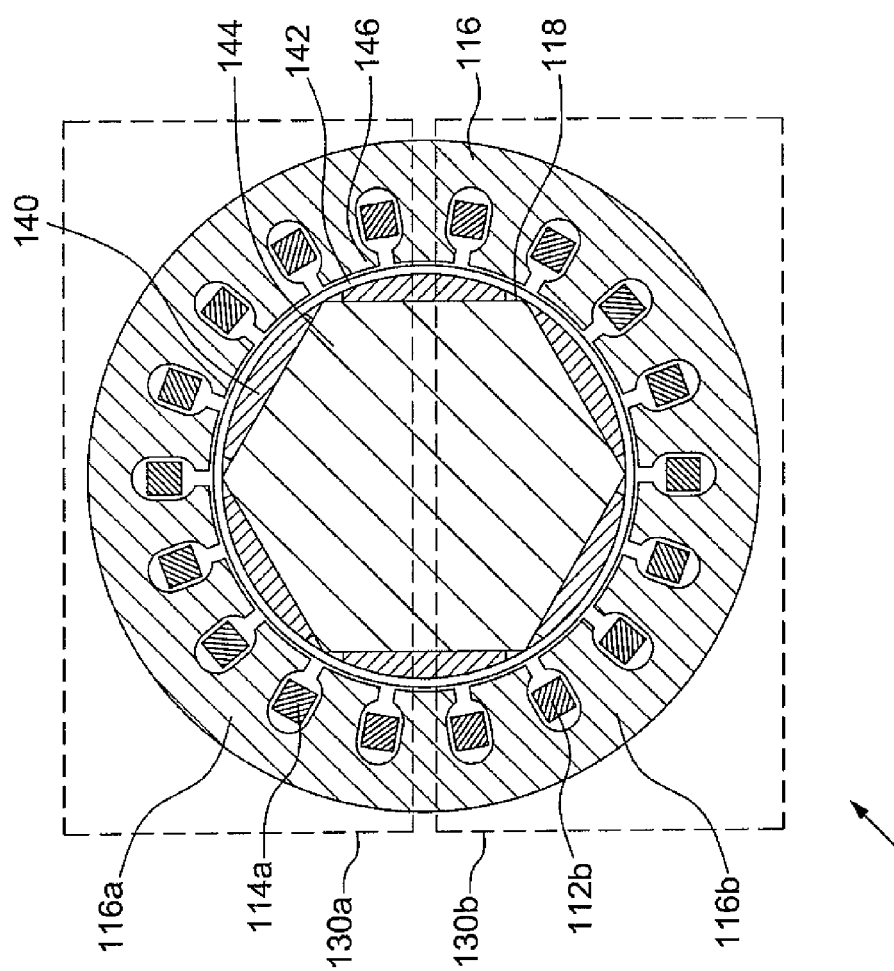
FIG. 3a is a cross-section and FIG. 3b is an exploded isometric view of a motor of the system of FIG. 1.
Figure 3B:
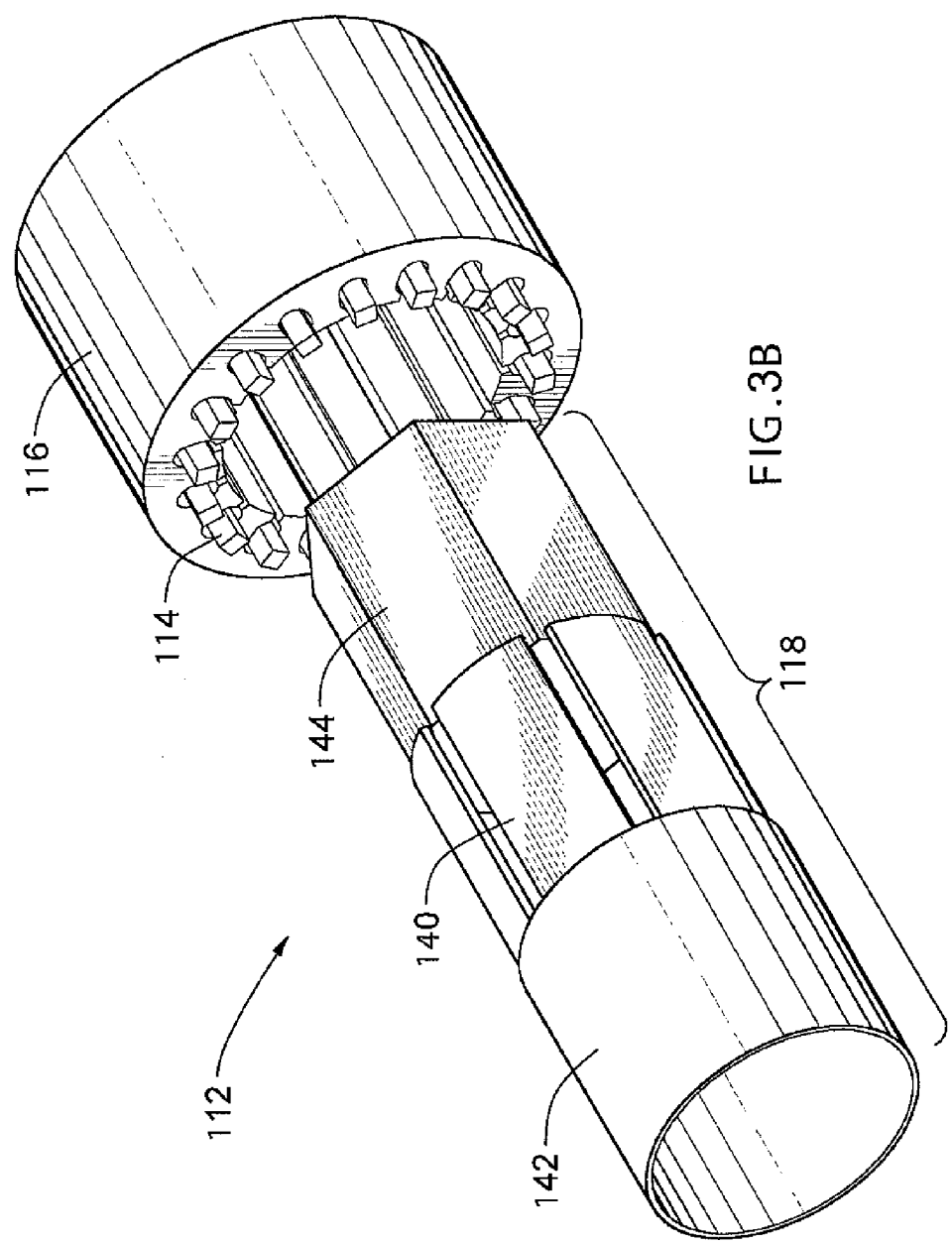
Figure 3C:
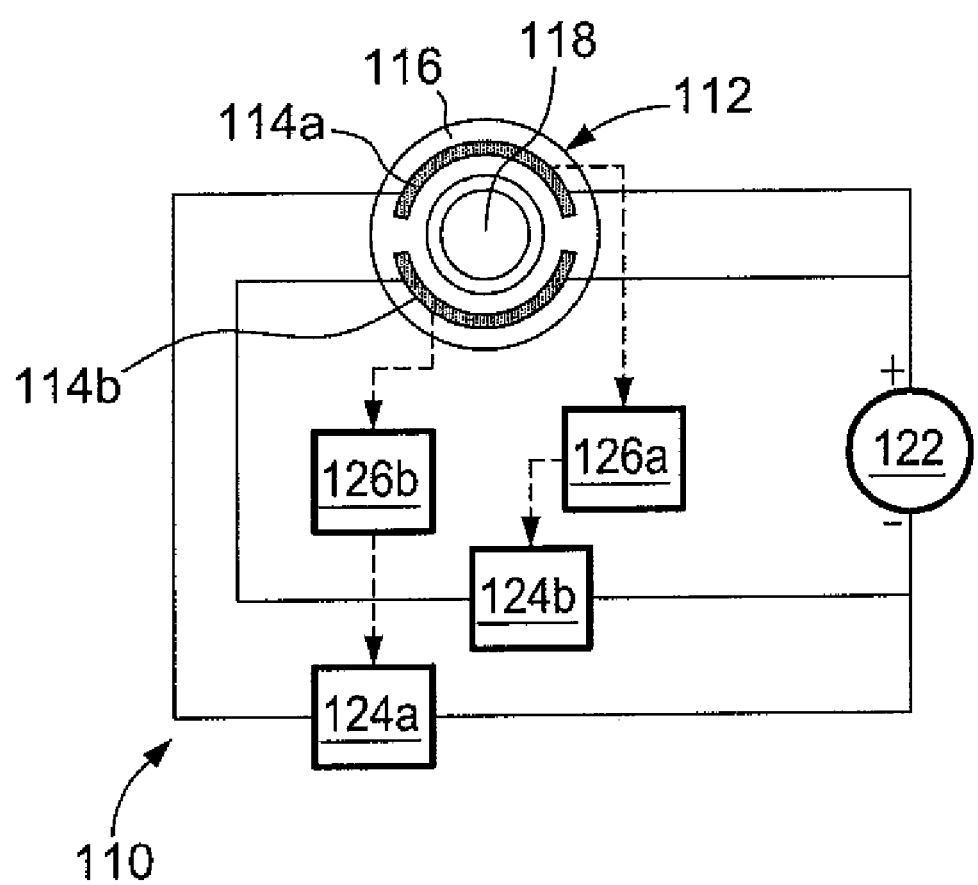
FIG. 3c is a schematic representation of the a control system of the embodiment of FIGS. 3a-3b.

Referring to FIGS. 3a and 3b, PMSM machine 112 is shown, having independent three-phase winding sets 114a and 114b, a cylindrical stator 116 and a cylindrical rotor 118 mounted for rotational motion relative to the stator. Winding sets 114a and 114b, together with their corresponding stator portions, provide two separate electromagnetic systems 130a and 130b, by reason of the windings' electrical isolation from one another. Rotor 118 has permanent magnets 140 mounted by a retaining ring 142 to a rotatable shaft 144. Stator 116 has a plurality of teeth 146 separating adjacent windings. (For ease of illustration, the adjacent elements of windings 114a and 114b in FIG. 3b are shown unconnected.). As depicted in FIG. 3c, in a similar manner as described above winding set 114a is electrically connected to power source 122 via commutation circuit 124, and winding set 114b is preferably also selectively connected to power source 122 via commutation circuit 124. Referring to FIG. 3c, preferably a motor drive and commutation circuit 24 and a rotor position sensing circuit 26 is provided for each winding set, such that circuits 24a and 24b and 26a and 26b are provided. The rotor position circuits 26 are cross-connected (e.g. 26b to 24a and 26a to 24b) so that either (or both) set of windings may be driven and that the signals sensed from the inactive set are fed to properly commute the driven set. PMSM 112 may otherwise be conventional in its construction, as desired. PMSM may also be made in accordance with the teachings of the applicant's U.S. Pat. No. 6,313,560, also incorporated into this disclosure by reference.

Figure 4:
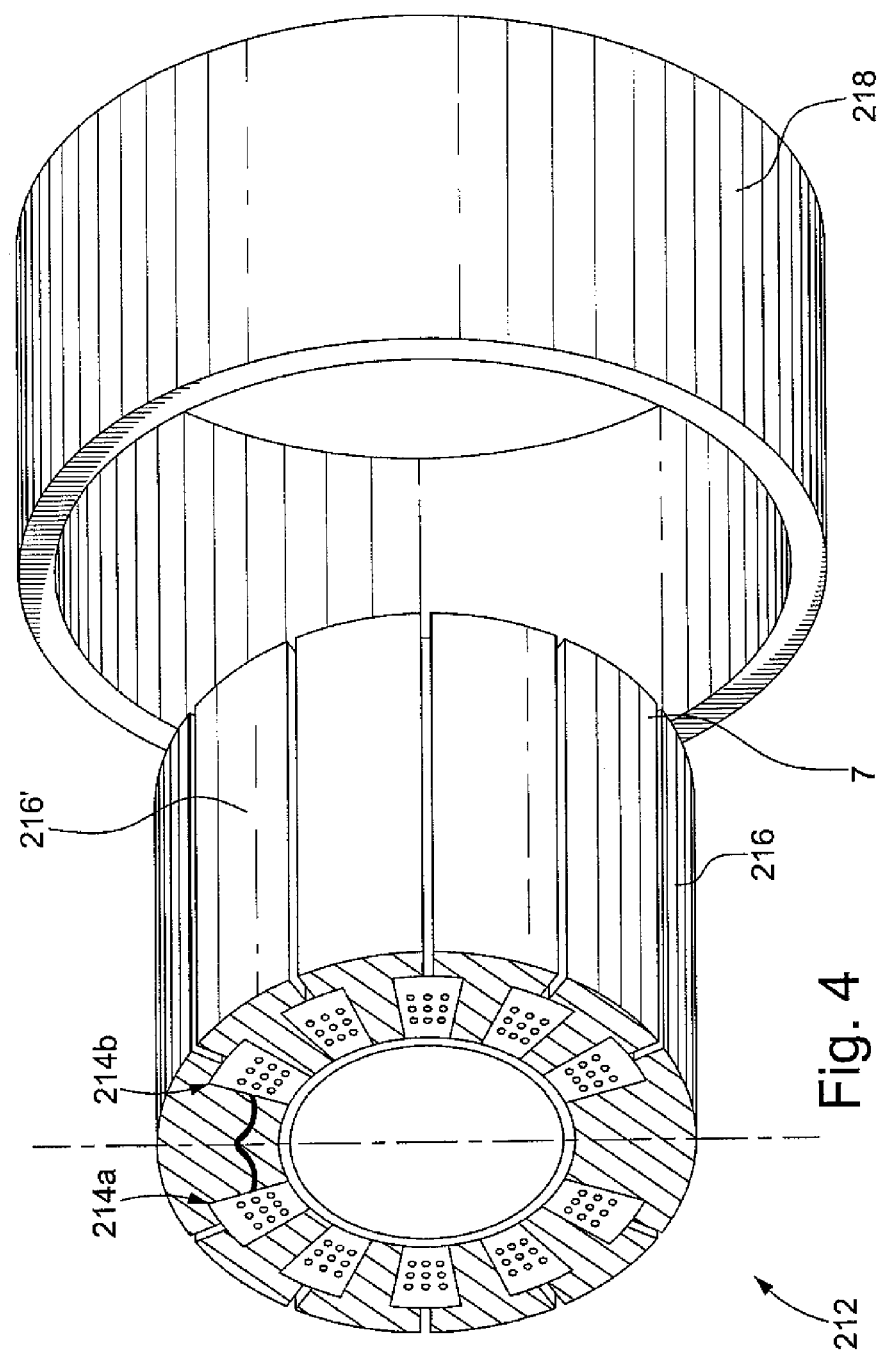
FIG. 4 is an exploded isometric view of an alternate construction for the motor of FIG. 1.

Referring to FIG. 4, in another embodiment motor 212 is shown in an "outside rotor" dual channel configuration, in which rotor 218 surrounds stator 216. Stator 216 has winding sets 214a and 214b. Stator 216 has a rotor-facing surface 216'. Though not depicted in FIG. 4, winding set 214a is electrically connected to power source 314 (not shown) via commutation circuit 224 (not shown), and winding set 214b is preferably also selectively connected to power source 222 via commutation circuit 224. Winding set 214b is also similarly electrically connected to rotor position recognition circuit 226 (not shown) which is, in turn, connected for feedback communication with commutation circuit 224.

Figure 5A:
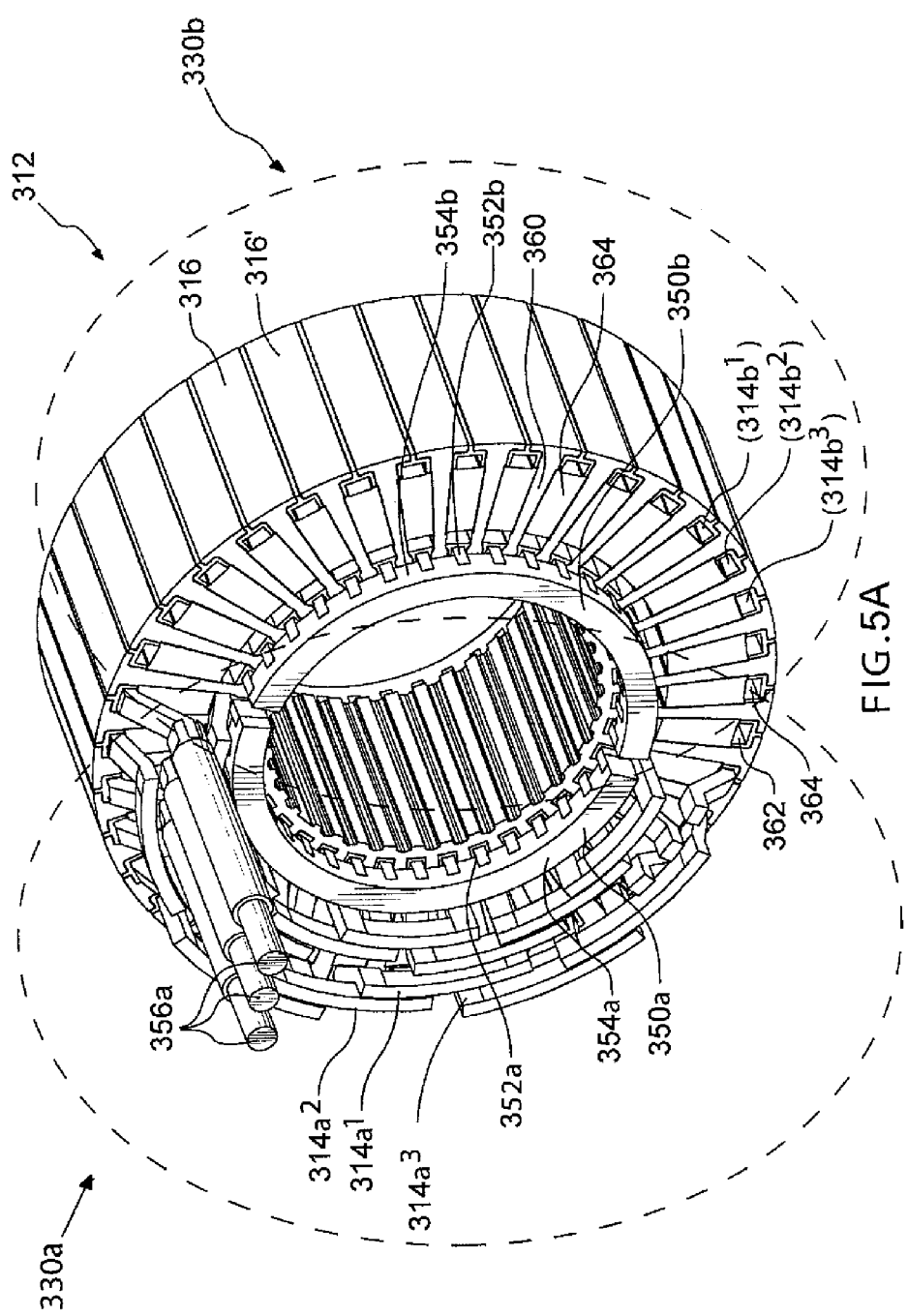
FIGS. 5a and 5b are front and rear isometric views of the stator of, and FIG. 5c is an exploded isometric view of, a further alternate construction for the motor of FIG. 1.
Figure 5B:
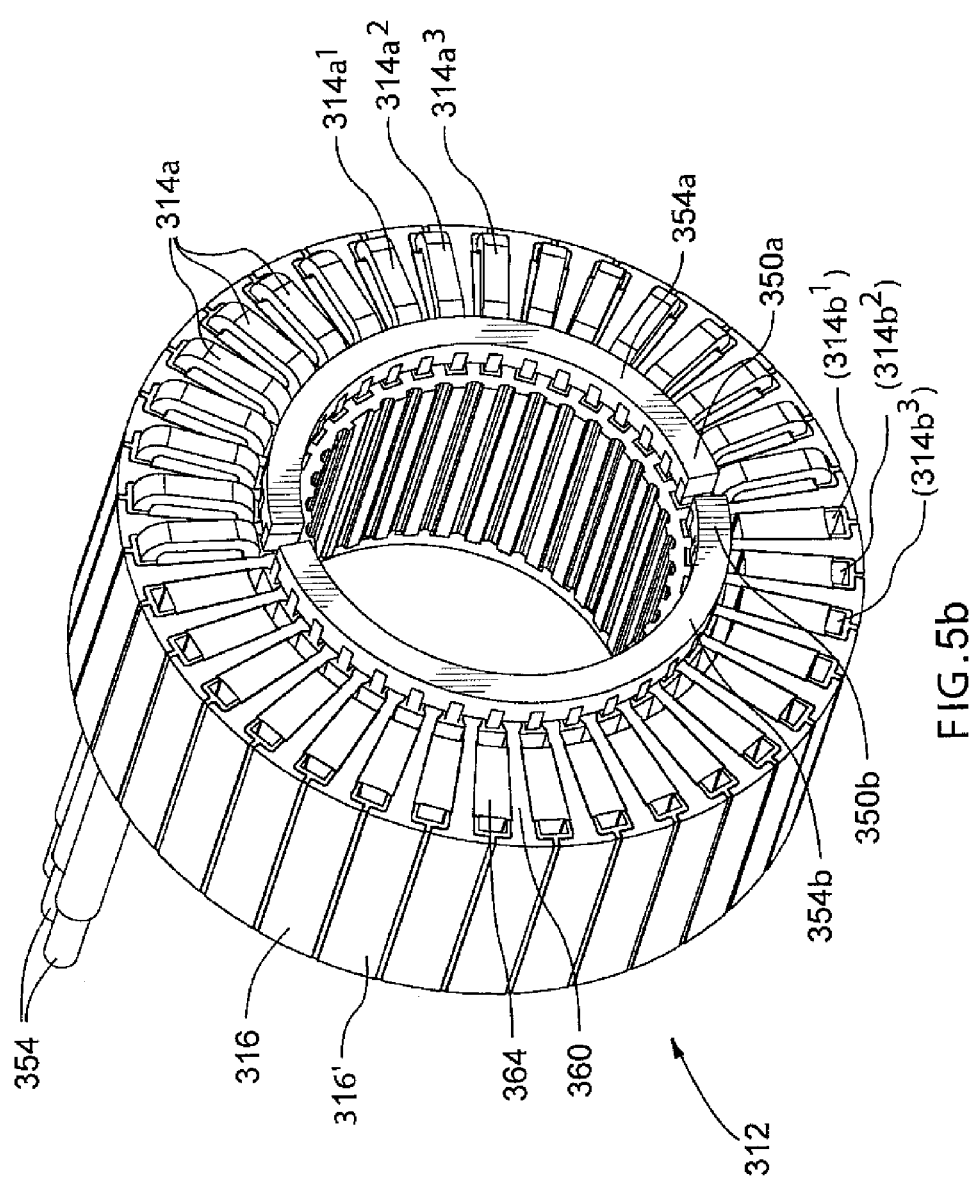
Figure 5C:
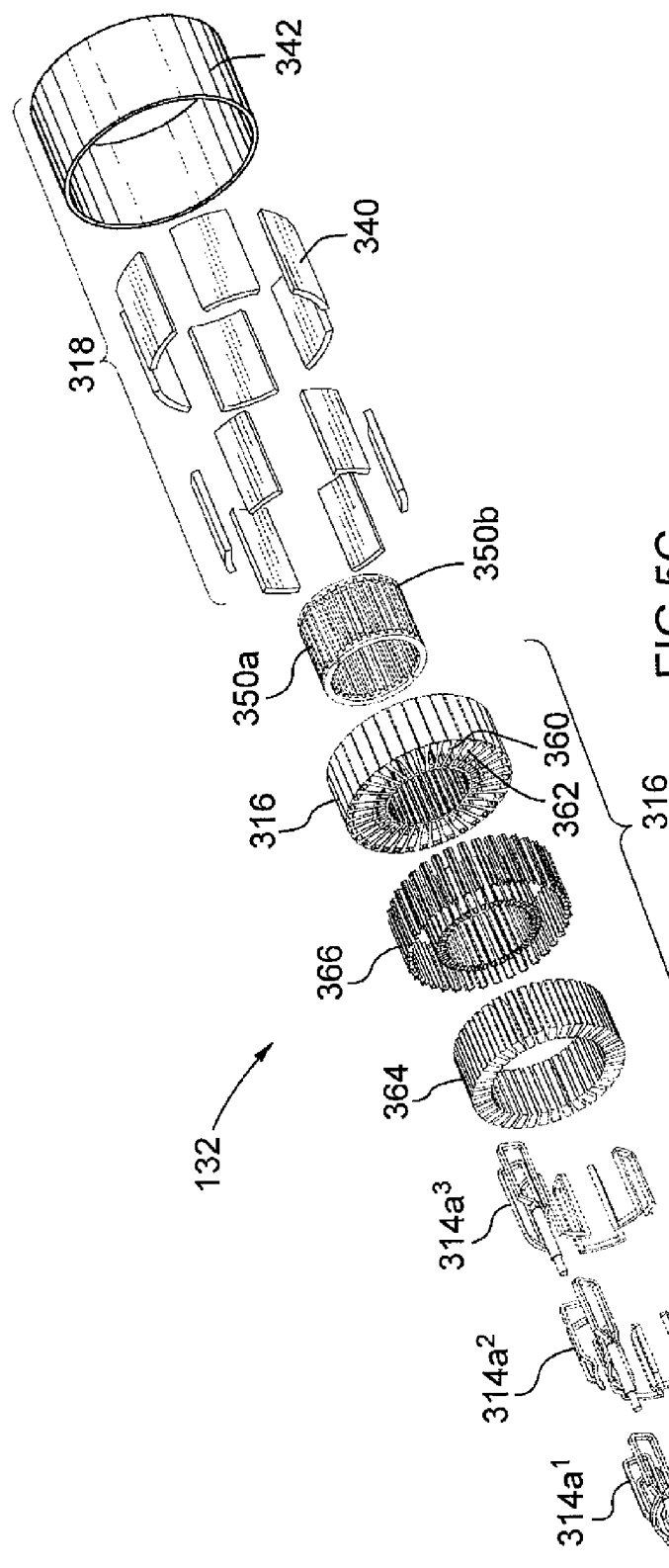

Referring to FIGS. 5a-5c, an outside-rotor, 3-phase, dual channel PMSM motor is provided with a "primary" and "secondary" winding configuration and machine architecture as described in detail in the applicant's co-pending application Ser. No. 10/444,952, incorporated herein by reference. The details of the construction and operation of this embodiment are fully described in the incorporated reference, and thus need only be summarily described here. For clarity, it should be noted that FIGS. 5a-5c omit one winding set or channel to more easily depict the construction of the device.

PMSM 312 has primary winding sets 314a and 314b (314b not shown for clarity), in stator 316 surrounded by a rotor 318 (see 5c). Two separate channels 330a and 330b are provided by reason of the electrical isolation of winding sets 314a and 314b. As also apparent from the figures, the two channels are also spatially remote from one another, providing magnetic isolation.

Referring to FIG. 5a, in this embodiment three primary windings 314a are provided, namely primary windings $314a^1$, $314a^2$ and $314a^3$, to provide the desired 3-phase configuration. Each primary winding 314a is provided with its own primary terminal 356a for ease of connection to power source 322 and commutation circuit 324 (neither shown). Likewise, primary windings 314b (not shown) have terminals for connection to commutation circuit 324 and rotor position recognition circuit 326 (not shown) in a similar manner as described above. Primary windings 314a and 314b are provided between stator teeth 360 in slots 362, and are wrapped around a bridge portion 364 provided in slot 360. Preferably paper spacers 366 are provided for insulation. In addition to primary winding sets 314a and 314*b*, stator 316 also has secondary windings sets 350*a* and 350*b* each have squirrel cage-type arrangement (i.e. with legs 352 and end rings 354).

Bridges 364 are preferably non-integral with stator 316, and thus inserted as an assembly as depicted schematically in FIG. 5*c,* which advantageously permits the designer to select different materials for bridge 364 and stator 316. For example, a bridge material may be chosen to alter the magnetic or performance characteristics of motor 312, as is discussed in application Ser. No. 10/444,952. Non-integral bridges 364 may also beneficially facilitate motor assembly, as explained further below.

Figure 6A:
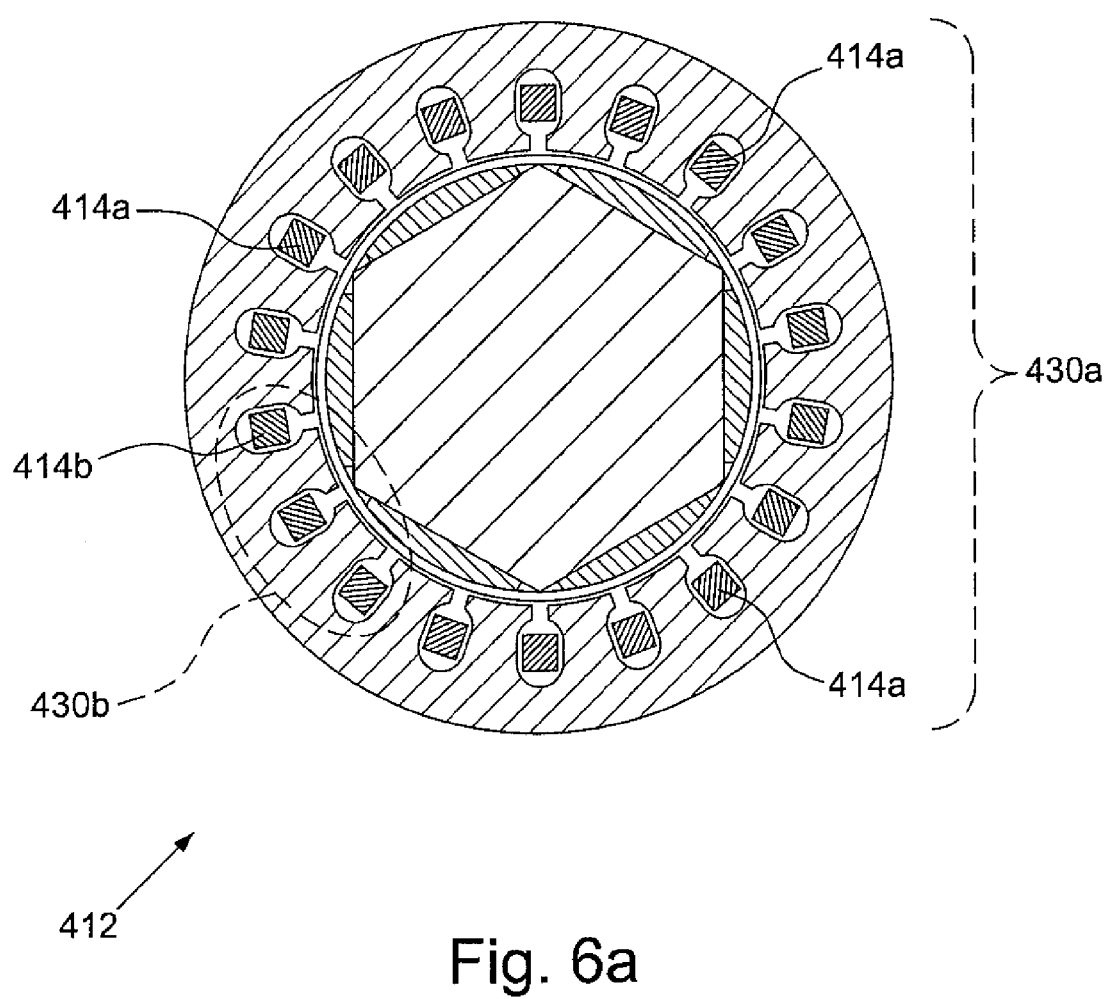
FIGS. 6a and 6b are each cross-sections of further alternate constructions for the motor of FIG. 1.
Figure 6B:
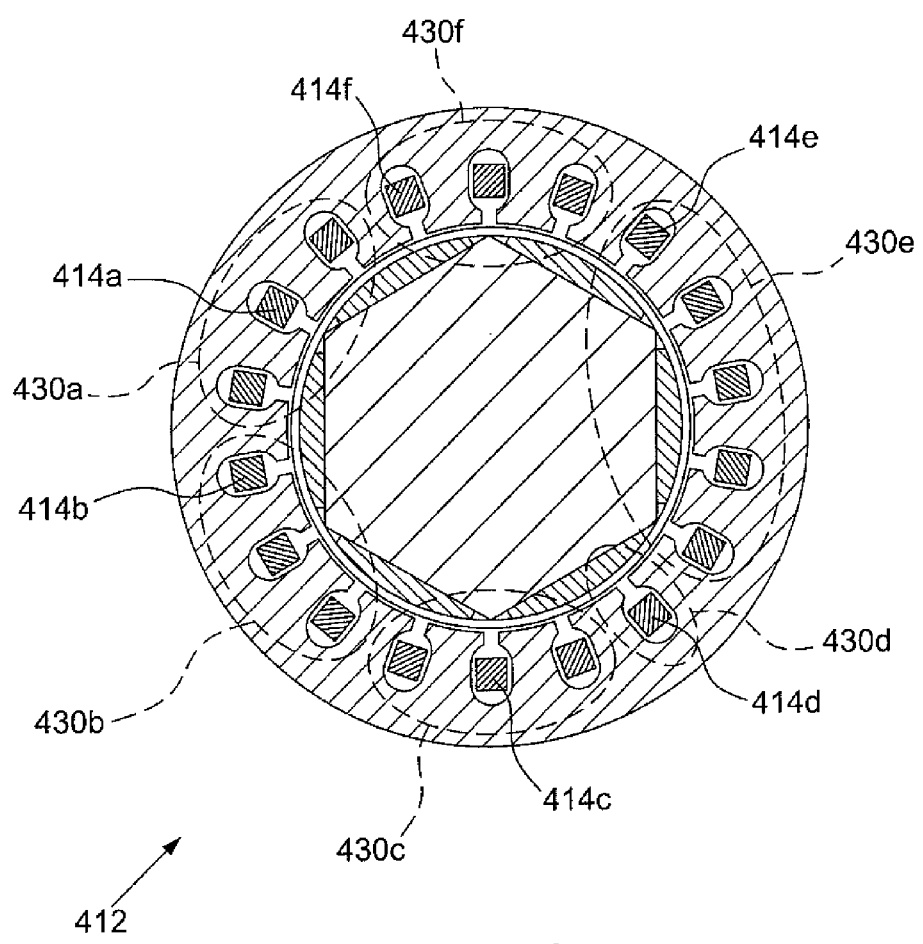

Referring to FIGS. 6*a* and 6*b,* various arrangements and numbers of channels can be provided in the motor. In FIG. 6*a,* channel 430*a* dominates the machine layout, while channel 430*b* is restricted to one sector of the stator. As above, the two channels are substantially magnetically isolated and spatially remote from one another. Referring to FIG. 6*b,* multiple channels 430*a*-430*f* are provided, each having a differing number of phases. In either case, the channels may be connected to commutation circuits and/or rotor position recognition circuits (neither shown), as desired in light of the teachings above.

Figure 7:
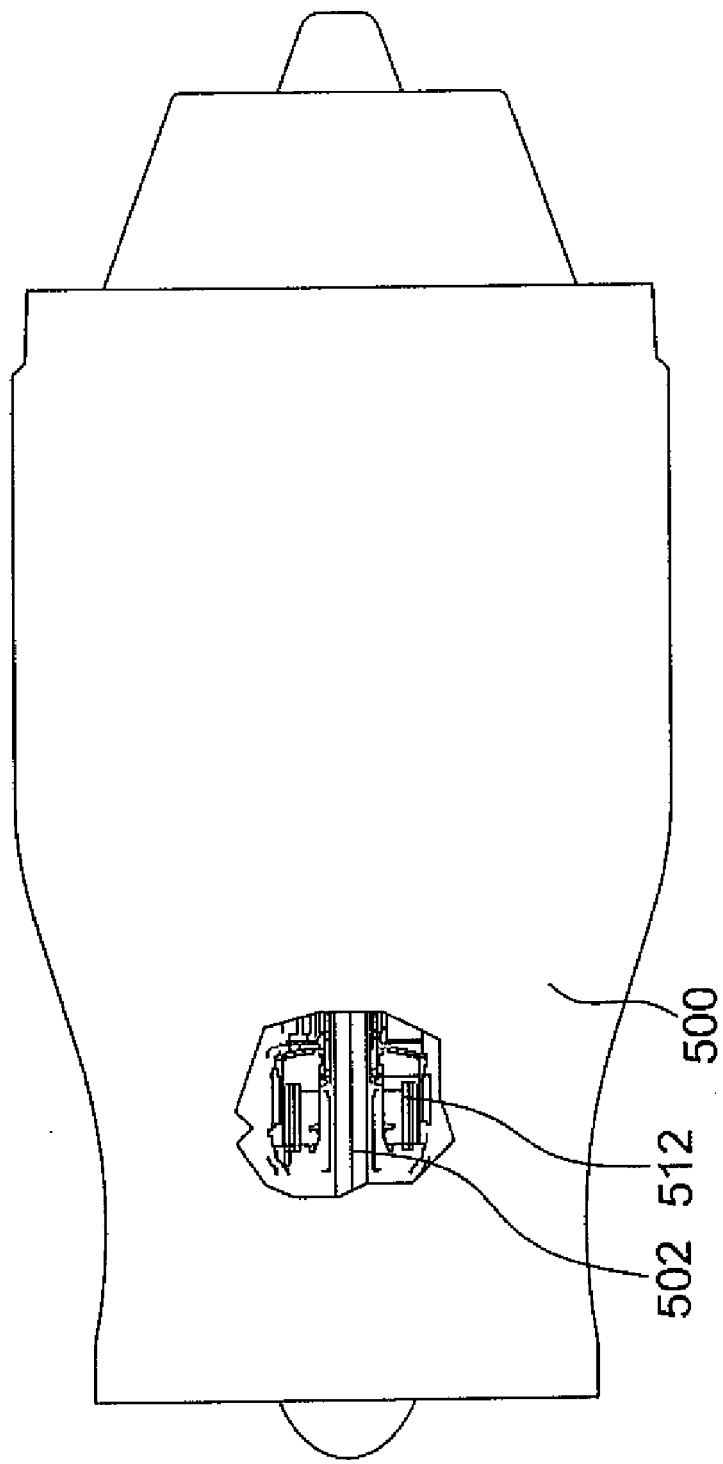
FIG. 7 is a side view of a gas turbine engine incorporating the present invention, with a portion of the engine broken away to reveal a cross-section thereof.

Referring to FIG. 7, the present invention is particularly well suited, among other things, to act as a starter 512 driving a shaft 502 to start gas turbine engine 500, as depicted in an integral embodiment in FIG. 7. A non-integral starter (not shown) is also available, as will be understood by the skilled reader.

The above description is meant to be exemplary only, and one skilled in the art will recognize that changes may be made to the embodiments described without departing from the scope of the invention disclosed. For example, though preferred the invention does not require a 3-phase input signals, and may be used with any multiphase winding. A three-phase winding set is preferred because it simplifies the associated electronics by allowing the use of commercially-available integrated circuits designed to be used with 3 Hall sensors to sense rotor position.

In the above description, in steady-state motor operation one channel is used to drive the motor, while the other channel is used for recognizing rotor position. It will be understood that both channels could be used for motoring, for example if added torque is required, preferably as long as unenergized phase(s) are monitored as described above for rotor position. More than two channels may be provided to the motor, and the channels need not be symmetric or of equal size. More than one rotor position recognition circuit and/or channel may be provided, and some channels may be used for other purposes not described herein. The stator need not be slotted. Though described with reference to a synchronous alternating current permanent magnet motor, the present invention may be applied to all types brushless permanent magnet motors. The common rotor may in fact be multiple rotors on a common shaft, such that the position sensing of one rotor will permit the position of all rotors on the shaft to be determined.

Figure 8:
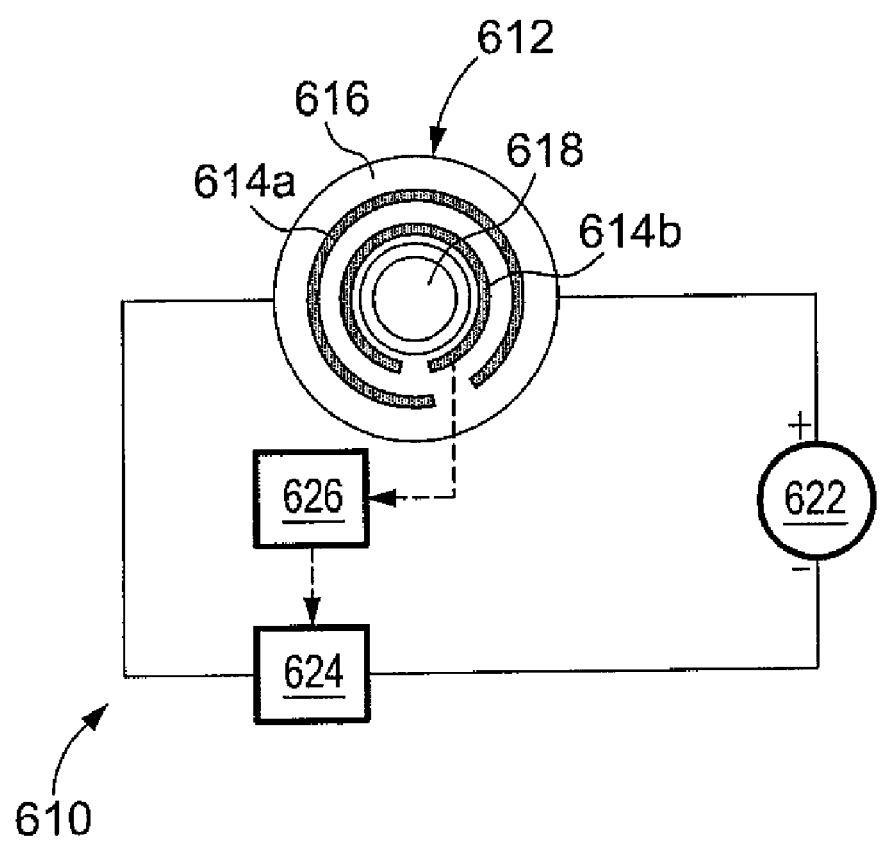
FIG. 8 is a schematic representation of a further embodiment of the present system.

In another dual channel embodiment (FIG. 8), the second channel or winding set may share the same slot as the first channel or main winding but be electrically isolated from the main winding set. The flux in the undriven windings induced by the rotor magnets would typically be significantly greater than the flux induced by adjacent winding currents, and current/voltage transformation and signal processing can be used to improve the input rotor position signal.

Still other modifications which fall within the scope of the present invention will be apparent to those skilled in the art, in light of a review of this disclosure, and such modifications are intended to fall within the equivalents accorded to the appended claims.

The invention claimed is:

1. A motor system comprising:
   a stator, the stator having at least a first and a second multiphase winding, the first and second windings being electrically isolated from one another and non-interlaced with one another, the first and second windings occupy non-overlapping sector segments of the stator;
   a rotor mounted for movement relative to the stator about an axis, the rotor having at least one permanent magnet mounted thereon;
   a drive circuit including a power source and a commutation circuit, the drive circuit electrically connected to at least the first winding to, in use, provide electricity to the first winding to rotationally drive the rotor about the axis; and
   a rotor position recognition circuit connected to the second winding, the rotor position recognition circuit adapted to, in use, determine rotor position based on an electricity induced in the second winding when the rotor passes the second winding, the rotor position recognition circuit connected to the drive circuit for providing feedback information to the drive circuit regarding said determined rotor position.

2. The motor system of claim 1 wherein the first and second windings have at least three phases.

3. The motor system of claim 1 wherein the first and second windings are spaced apart from one another.

4. An electric motor system comprising:
   a rotor mounted for rotation about an axis, the rotor having at least one permanent magnet mounted thereon;
   a cylindrical stator, the stator having at least a first sector and a second sector relative to the rotor rotation axis, the first and the second sectors being distinct from one another, the stator having first and a second multiphase winding set, wherein the first winding set is confined to the first sector and the second winding set is confined to the second sector;
   a motor drive connected to a power source and to the first winding set to thereby selectively energize the first winding set to electrically drive rotation of the rotor; and
   a rotor position decoder connected to the second winding set to thereby acquire signals from the second winding set for providing rotor position information to the motor drive.

5. The motor system of claim 4 wherein said second winding set is not connected to the motor drive.

6. A motor system comprising:
   a permanent magnet rotor;
   stator having at least a first multiphase winding set and a second multiphase winding set, the first and second winding sets substantially electrically and magnetically isolated from one another, the first set positioned in the stator, magnetism induced, in use, by electricity flowing through the first set causing the rotor to rotate, the second set positioned in the stator, the rotating rotor, in use, inducing electricity to flow through the second set, the first and second winding sets being non-overlapping relative to one another in the stator;
   a first control system adapted to provide electricity to the first winding set to continuously drive rotation of the rotor; and a second control system adapted to receive electricity induced in the second windings and provide rotor position information to the first control system.

7. The motor system of claim 6 further comprising:

a third control system adapted to provide electricity to the second winding set to continuously drive rotation of the rotor;

a fourth control system adapted to receive electricity induced in the first windings and provide rotor position information to the third control system.

8. A motor system comprising:

a permanent magnet rotor;

stator having at least a first multiphase winding set and a second multiphase winding set, the first and second winding sets substantially electrically and magnetically isolated from one another, the first and the second winding sets occupying non-overlapping sector segments of the stator;

a motor drive connected to a power source and the first winding set to thereby selectively energized the first winding set to electrically drive rotation of the rotor; and a rotor position decoder connected between the second winding set and the motor drive to thereby acquire signals from the second winding set for providing rotor position information to the motor drive.

9. The motor system of claim 8 wherein the first and second windings are disposed in distinct sectors of the stator.

10. The motor system of claim 8 wherein the first and second windings sets are arranged serially with one another relative to a permanent magnet rotation path of the rotor.

11. The motor system of claim 8 wherein each winding set is a 3-phase winding set.

12. The motor system of claim 8 further comprising a commutation apparatus connected to the first winding set and a rotor position sensing apparatus connected to the second winding set, wherein the rotor position sensing apparatus is connected to commutation apparatus for providing rotor position feedback information to the commutation apparatus.

13. A brushless motor system comprising:

at least a first magnetic circuit including at least a first permanent rotor magnet mounted for rotation on a shaft, a first stator adjacent the first rotor magnet, and at least one multiphase winding set associated with the first stator portion;

at least a second magnetic circuit including at least a second permanent rotor magnet mounted for rotation on the shaft, a second stator portion adjacent the second rotor magnet, and at least one multiphase winding set associated with the second stator portion, the second stator portion winding set being electrically isolated from the first stator portion winding set, the second magnetic circuit being isolated from the first magnetic circuit, the first and the second winding sets occupying non-overlapping sector segments of the stator;

a commutation apparatus adapted to, in use, provide commutation signals to the first stator portion winding set to cause the first stator portion winding set to drive rotation of the first rotor magnet; and a rotor position sensing apparatus adapted to, in use, receive input from the second stator portion winding set and provide output rotor position information to the commutation apparatus.

14. The motor system of claim 13 wherein the first and second stators portions are part of a same stator body.

15. The motor system of claim 13 wherein the first and second stator portions are distinct sectors of a same stator body.

16. The motor system of claim 15 wherein only said first and second magnetic circuits and said first and second multiphase winding sets are provided, and wherein the first and second stators portions each occupy a different half of the stator body.

* * * * *